(12) United States Patent
Yang

(10) Patent No.: US 11,692,475 B2
(45) Date of Patent: Jul. 4, 2023

(54) INJECTION STRUCTURE USING AN INTEGRATED EXHAUST HEAT RECOVERY SYSTEM CONDENSATE

(71) Applicants: HYUNDAI MOTOR COMPANY, Seoul (KR); KIA CORPORATION, Seoul (KR)

(72) Inventor: Il Suk Yang, Hwaseong-si (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 0 days.

(21) Appl. No.: 17/967,303

(22) Filed: Oct. 17, 2022

(65) Prior Publication Data

US 2023/0167761 A1    Jun. 1, 2023

(30) Foreign Application Priority Data

Nov. 30, 2021    (KR) .......................... 10-2021-0168135

(51) Int. Cl.
| | |
|---|---|
| *F01N 5/02* | (2006.01) |
| *F02M 26/35* | (2016.01) |
| *F01P 7/16* | (2006.01) |
| *F02M 26/29* | (2016.01) |

(52) U.S. Cl.
CPC .................. *F01P 7/16* (2013.01); *F01N 5/02* (2013.01); *F02M 26/29* (2016.02); *F02M 26/35* (2016.02)

(58) Field of Classification Search
CPC . F01P 7/16; F02M 26/29; F02M 26/35; F01N 5/02
See application file for complete search history.

(56) References Cited

U.S. PATENT DOCUMENTS

| | | | |
|---|---|---|---|
| 10,561,989 B1* | 2/2020 | Bradford | ................. F01N 3/005 |
| 2016/0153376 A1* | 6/2016 | Katayama | ........... F02D 41/0052 |
| | | | 123/445 |
| 2016/0153406 A1* | 6/2016 | Takada | ................... F02M 26/22 |
| | | | 60/278 |

FOREIGN PATENT DOCUMENTS

KR            102261380 B1    6/2021

* cited by examiner

*Primary Examiner* — Jacob M Amick
(74) *Attorney, Agent, or Firm* — Lempia Summerfield Katz LLC

(57) ABSTRACT

An injection structure using integrated exhaust heat recovery system (EHRS) condensate, the structure including an integrated heat exchange part connected to an engine of a vehicle and branched from an exhaust outlet of an exhaust manifold to integrate exhaust gas recirculation (EGR) and EHRS, a condensate circuit part extended from a rear end of the integrated heat exchange part to the engine of the vehicle and configured to move exhaust gas condensate, a three-phase valve configured to open and close so that a low-temperature coolant is selectively introduced into the integrated heat exchange part according to operating conditions, an EGR valve configured to open and close so that EGR gas with filtered condensate flows into the engine of the vehicle, a bypass valve fluidly connected to an exhaust muffler, and a controller configured to control opening and closing of the three-phase valve, the EGR valve, and the bypass valve according to the operating conditions.

10 Claims, 5 Drawing Sheets

_(1)_

INJECTION STRUCTURE USING AN INTEGRATED EXHAUST HEAT RECOVERY SYSTEM CONDENSATE

CROSS REFERENCE TO RELATED APPLICATION

The present application claims priority to Korean Patent Application No. 10-2021-0168135, filed Nov. 30, 2021, the entire contents of which are incorporated herein for all purposes by this reference.

BACKGROUND

Technical Field

The present disclosure relates to an injection structure using an integrated exhaust heat recovery system (EHRS) condensate and, more particularly, to an injection structure using an integrated EHRS condensate. The disclosed structure is configured to generate/store exhaust gas condensate produced in exhaust gas recirculation (EGR) and EHRS and to utilize same for water injection, a technology for knock mitigation in gasoline engines.

Description of the Related Art

In general, when an internal combustion engine starts operating, mechanical friction increases due to the low temperature of an engine. This causes more fuel to be consumed and carbon dioxide ($CO_2$) emissions increase. This problem arises especially in gasoline-electric hybrid vehicles having "stop/start" states, which are kept at a lower temperature compared to the internal combustion engine of non-hybrid vehicles. The internal combustion engine of a hybrid vehicle is kept at a lower temperature due to frequent shutdown events, such as when operating in electric mode.

Therefore, it may be advantageous to use recirculating fluid as a heat source for temperature control of the internal combustion engine. Typically, as a system using recirculating fluid, an exhaust gas recirculation (hereinafter referred to as "EGR") system or a separate exhaust heat recovery system (hereinafter referred to as "EHRS") is used.

In a hybrid vehicle, a separate cooling circuit is also installed in addition to the engine cooling system to cool electric parts that are heat generating components, for example, a hybrid starter and generator (HSG), a hybrid power control unit (HPCU), and the like as power electric (PE) components.

In other words, a cooling circuit for heat generating components is additionally installed in which a coolant (cooling water) is pumped from a reservoir tank and supplied to the HSG to cool the HSG. The coolant that cooled the HSG is supplied to a low-temperature radiator to cool the coolant through heat exchange with the outdoor air, and this coolant is supplied to the HPCU to cool the HPCU and then circulates back to the reservoir tank. The cooling circuit for heat generating components and the engine cooling circuit do not share coolant with each other and constitute separate cooling circuits.

However, in the conventional two-circuit cooling method of a hybrid vehicle, EGR gas is cooled through heat exchange with the coolant in an EGR cooler. In this case, the temperature of the coolant rises to 90 degrees or more after the engine is warmed up, and the temperature of the EGR gas cooled through heat exchange with this high-temperature coolant in the EGR cooler also rises to at least 90 degrees.

When the high-temperature EGR gas is combined with intake air flowing into the engine through another path and flows into the engine, the volumetric efficiency of the intake air decreases, the effect of improving fuel efficiency is lowered, and there is a risk of engine knocking.

Also, in the case of the EGR system, when the coolant temperature is low or outdoor temperature is low, the moisture contained in the EGR gas causes condensate to form in the EGR cooler or in an intake system. This may lead to engine damage due to excessive inflow of condensate into a combustion chamber and corrosion due to condensate's acidic nature, limiting actual operating conditions and serving as a constraint on fuel efficiency improvement.

Further, although EGR operation is restricted depending on the coolant and outdoor temperature conditions, since condensate is not completely suppressed, reliability problems such as corrosion of related parts due to condensate are continuously being raised.

SUMMARY

Accordingly, the present disclosure has been made keeping in mind the above problems occurring in the related art. The present disclosure is intended to provide an injection structure using integrated EHRS condensate, which can utilize exhaust gas condensate for a water injection technology by configuring a separate condensate circuit part.

In addition, the present disclosure is intended to provide an injection structure using integrated EHRS condensate, which is configured to control the opening and closing of a three-phase valve, an EGR valve, and a bypass valve with a controller, thereby easily generating condensate required for water injection according to operating conditions.

Objectives of the present disclosure are not limited to the ones mentioned above, and other objectives of the present disclosure not mentioned can be understood by the following description and can be seen more clearly by the embodiments of the present disclosure. Also, the objectives of the present disclosure can be realized by means and combinations thereof indicated in the claims.

In order to achieve the above objective, according to an embodiment of the present disclosure, there is provided an injection structure using integrated EHRS condensate, the injection structure including: an integrated heat exchange part connected to an engine of a vehicle, and branched with an exhaust muffler from an exhaust outlet of an exhaust manifold to integrate EGR and EHRS; a condensate circuit part extended from a rear end of the integrated heat exchange part to the engine of the vehicle, and configured to move exhaust gas condensate; a three-phase valve connected to a front end of the integrated heat exchange part, and configured to open and close so that a low-temperature coolant is selectively introduced into the integrated heat exchange part according to operating conditions; an EGR valve connected to the integrated heat exchange part, and configured to open and close so that EGR gas with filtered condensate flows into the engine of the vehicle; a bypass valve positioned at the rear end of the integrated heat exchange part to be fluidly connected to the exhaust muffler; and a controller configured to control opening and closing of the three-phase valve, the EGR valve, and the bypass valve according to the operating conditions.

In an embodiment of the present disclosure, the condensate circuit part may include: a filter connected to the rear end of the integrated heat exchange part, and configured to filter the condensate from the exhaust gas; a condensate tank connected to the filter, and configured to store filtered condensate; a level sensor formed in the condensate tank, and configured to measure a flow rate of condensate stored in the condensate tank; and an injector connected to the rear end of the condensate tank, and configured to inject condensate discharged from the condensate tank to the engine of the vehicle.

In an embodiment of the present disclosure, the three-phase valve may be connected to an electric parts cooling system, where the controller may control the low-temperature coolant to flow into the integrated heat exchange part from the electric parts cooling system by opening the three-phase valve under high-temperature operating conditions.

In an embodiment of the present disclosure, the controller may close the three-phase valve, the EGR valve, and the bypass valve, and control the injector to operate under start operating conditions.

In an embodiment of the present disclosure, the controller may close the three-phase valve and the bypass valve, adjust an opening degree of the EGR valve, and control the injector to operate under low-temperature operating conditions.

In an embodiment of the present disclosure, the controller may open the three-phase valve and the bypass valve, adjust an opening degree of the EGR valve, and control the injector to operate under high-temperature operating conditions.

In an embodiment of the present disclosure, the level sensor may include: a first level sensor positioned in the condensate tank; and a second level sensor positioned higher in a height direction of the condensate tank than the first level sensor.

In an embodiment of the present disclosure, the controller may receive a first signal from the first level sensor and control the injector to stop an operation.

In an embodiment of the present disclosure, the controller may receive a second signal from the second level sensor and control the injector to operate.

The injection structure using integrated EHRS condensate of the present disclosure may further include an inlet positioned in the condensate tank, and formed so that the condensate tank is able to be filled with water from outside the condensate tank.

The present disclosure can obtain the following effects through the previously described embodiments, and the configuration, combination, and use relation described below.

As the exhaust gas condensate can be used for a water injection technology by configuring a separate condensate circuit part, it is possible to improve fuel efficiency by suppressing engine knocking.

In addition, the controller controls the opening and closing of the three-phase valve, the EGR valve, and the bypass valve to easily generate condensate required for water injection according to the operating conditions, resulting in improved output by lowering the combustion temperature.

BRIEF DESCRIPTION OF THE DRAWINGS

The above and other objectives, features, and other advantages of the present disclosure should be more clearly understood from the following detailed description when taken in conjunction with the accompanying drawings, in which.

DETAILED DESCRIPTION

Figure 1:
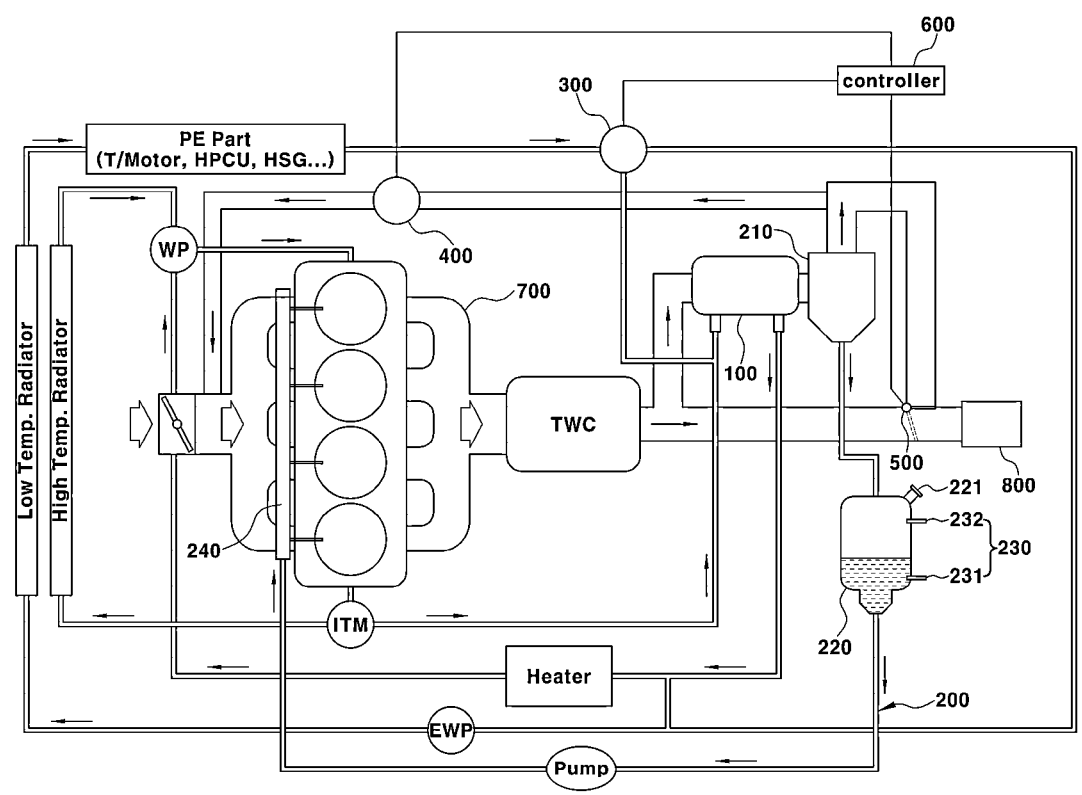
FIG. 1 is a configuration diagram of an injection structure using integrated EHRS condensate according to an embodiment of the present disclosure.

Hereinafter, embodiments of the present disclosure are described in detail with reference to the accompanying drawings. The embodiments of the present disclosure may be modified in various forms, and the scope of the present disclosure should not be construed as being limited to the following embodiments. The embodiments are provided to more completely explain the present disclosure to those of ordinary skill in the art.

In addition, terms such as " . . . part", " . . . line", " . . . system", and the like described in the specification mean a unit that processes at least one function or operation, which may be implemented in hardware or a combination of hardware.

Also, in the specification, the reason that the names of components are divided into 1st, 2nd, and the like is to classify them as the names of the components are the same, and it is not necessarily limited to the order in the following description.

In addition, "upper" described in the specification means a direction moving to the top in the height direction on the drawing, and "lower" means a direction moving to the bottom in the height direction on the drawing.

Also, in the specification, when a part is said to be "above" another part, this includes not only the case where it is "directly above" another part, but also the case where there is another part in between. In the same context, when a part is said to be "below" another part, it includes not only the case where it is "directly below" another part, but also the case where there is another part in between.

The present disclosure may be applied to a gasoline hybrid electric vehicle (HEV) as an embodiment, but the type of vehicle is not particularly limited. For a cooling system of the present disclosure, in addition to an engine cooling system, a separate electric parts cooling system for cooling electric parts may be installed. In other words, the engine cooling system and the electric parts cooling system are separated from each other so that electric parts cooling and engine cooling take place separately. In the specification, high-temperature coolant may mean engine coolant, and low-temperature coolant may mean electric parts coolant.

The engine cooling system of the present disclosure may include a high-temperature radiator that cools high-temperature coolant through heat exchange with outdoor air, a water pump (WP) connected to the high-temperature radiator to pump the coolant cooled in the high-temperature radiator and supply it to the engine, the engine cooled by receiving the coolant pumped from the water pump, and an integrated heat exchange part 100 that is connected to the engine to receive the coolant cooling the engine and that conducts heat exchange of the supplied coolant with the EGR gas to cool the EGR gas. Also, the engine cooling system of the present disclosure may be configured to have a line that is connected to the water pump via a heater (HTR) for warming up the inside of a vehicle, so that the coolant which has cooled the EGR gas is able to flow back into the water pump.

The electric parts cooling system of the present disclosure may be configured so that an electric water pump (EWP) pumps low-temperature coolant and supplies it to the electric parts to cool the electric parts. The low-temperature coolant that has cooled the electric parts is supplied to the low-temperature radiator and cooled through heat exchange with the outdoor air. The low-temperature radiator can flow relatively low-temperature coolant compared to the high-temperature radiator.

In the specification, an operating condition may be a condition determined by a controller 600 according to the operating state of a vehicle. Operating conditions may be classified into start operating conditions, low-temperature operating conditions, and high-temperature operating conditions.

The operating conditions may be determined in consideration of engine speed, coolant temperature, atmospheric pressure, outdoor air temperature, vehicle speed, boost pressure, and fuel amount.

The controller 600 may determine that the vehicle is under a start operating condition when the engine of the vehicle is cold started. The start operating condition may mean a state before driving after the engine is started. When the temperature of the engine coolant is less than or equal to a preset value, the controller 600 may determine that it is a low-temperature operating condition. As an example, when the temperature of the engine coolant is 60 degrees or less in a HEV vehicle and raising the engine coolant temperature is delayed due to the low heating value as a result of the initial low-load driving, the controller 600 may determine that it is the low-temperature operating condition.

When the temperature of the engine coolant exceeds a preset value, the controller 600 may determine that it is a high-temperature operating condition. As an example, the high-temperature operating condition may be a case where the temperature of the engine coolant exceeds 60 degrees due to high-speed driving of the vehicle. The high-temperature operating condition may mean a case in which the engine warm-up is maximized or a case in which the load is high.

FIG. 1 is a configuration diagram of an injection structure using integrated EHRS condensate according to an embodiment of the present disclosure.

Referring to FIG. 1, the injection structure using integrated EHRS condensate according to an embodiment of the present disclosure may be configured to include the integrated heat exchange part 100, a condensate circuit part 200, the controller 600, a three-phase valve 300, an EGR valve 400, and a bypass valve 500, which are controlled to be opened and closed by the controller 600.

The integrated heat exchange part 100 may be connected to an engine of a vehicle, and branched with an exhaust muffler 800 from an exhaust outlet of an exhaust manifold 700 to integrate EGR and EHRS. The EGR system of the integrated heat exchange part 100 may be a system configured to recirculate a portion of the exhaust gas back to the intake system. The EHRS system of the integrated heat exchange part 100 may be a system configured to secure heating performance by recovering exhaust heat and transferring it to the heater.

The integrated heat exchange part 100 may be located in a flow path where the integrated heat exchange part 100 and the exhaust muffler branched from the exhaust outlet of the exhaust manifold 700. The integrated heat exchange part 100 may be configured to be introduced to the coolant. In one example, the integrated heat exchange part 100 may be configured to be introduced selectively to high-temperature coolant or low-temperature coolant according to operating conditions. The three-phase valve 300 may be opened and closed to selectively introduce low-temperature coolant into the integrated heat exchange part 100. Through this, the amount of condensate to be injected to the engine may be adjusted.

The integrated heat exchange part 100 may be configured to be introduced to exhaust gas from the exhaust outlet of the exhaust manifold 700. The integrated heat exchange part 100 may be configured such that the exhaust gas discharged from the exhaust manifold 700 passing through the integrated heat exchange part 100 to generates condensate.

In an embodiment, the exhaust outlet of the exhaust manifold 700 may be connected to two branched lines: one that is directed to the integrated heat exchange part 100 at the upper part; and the other one that is directly discharged to the exhaust muffler 800 at the lower part. The exhaust gas discharged from the exhaust manifold 700 may flow toward the exhaust muffler 800 or through the integrated heat exchange part 100. The controller 600 may be configured to adjust the exhaust gas flow rate flowing to the exhaust muffler 800 according to operating conditions.

The condensate circuit part 200 may extend from the rear end of the integrated heat exchange part 100 to the engine of the vehicle. In one example, the condensate circuit part 200 may mean a configuration that consists of a filter 210 connected to the rear end of the integrated heat exchange part 100, a condensate tank 220 for storing the filtered condensate, and an injector 240 for spraying the condensate to the engine.

The condensate circuit part 200 may be configured to move exhaust gas condensate. In one example, the condensate circuit part 200 may be configured to have a pump to move the filtered condensate so that the condensate is injected into the engine combustion chambers. The condensate circuit part 200 may be configured to inject condensate to the engine, thus reducing the combustion temperature and mitigating engine knock.

The integrated heat exchange part 100 may be configured to generate condensate in the process of heat exchange of exhaust gas. As an example, the amount of condensate generated in the integrated heat exchange part 100 may be calculated by multiplying the flow rate of exhaust gas by subtracting the amount of saturated water vapor at the temperature lowered by heat exchange from the amount of water vapor contained in exhaust gas.

The condensate circuit part 200 may be configured to include the filter 210, the condensate tank 220, a level sensor 230, and the injector 240. The filter 210 may be connected to the rear end of the integrated heat exchange part 100 and configured to filter condensate from the exhaust gas. As an example, the filter 210 may be configured in a centrifugal type, but the present disclosure is not particularly limited with respect to the filtering method. The rear end of the filter 210 may be configured such that an EGR inlet line and a line toward the exhaust muffler 800 are branched.

The condensate tank 220 may be connected to the filter 210 and configured to store filtered condensate. The level sensor 230 may be formed in the condensate tank 220, and configured to measure a flow rate of condensate stored in the condensate tank 220. The injector 240 may be connected to the rear end of the condensate tank 220, and configured to inject condensate discharged from the condensate tank 220 to the engine of the vehicle.

More specifically, at the lower end of the filter 210, the filtered condensate may be collected and discharged to the outside, and the discharged condensate may be collected in the condensate tank 220. The level sensor 230 may be configured to measure the amount of condensate stored in the condensate tank 220. A plurality of level sensors 230 may be formed at different positions in the height direction of the condensate tank 220.

A line through which the stored condensate is discharged to the outside may be formed at the lower end of the condensate tank 220. At one end of the line where the stored condensate is discharged to the outside, a pump configured to pressurize the condensate and supply it to the injector 240 may be further formed. The injector 240 may be configured to inject the condensate supplied from the condensate tank 220 for each cylinder of the engine.

The three-phase valve 300 may be connected to the front end of the integrated heat exchange part 100. In one example, the three-phase valve 300 may be configured such that the front end is connected to the electric parts cooling system, and configured to be connected to the front end of the integrated heat exchange part 100. The three-phase valve 300 may be opened and closed to selectively introduce low-temperature coolant into the integrated heat exchange part 100 according to operating conditions. The controller 600 may open the three-phase valve 300 under a high-temperature operating condition to control that low-temperature coolant from the electric parts cooling system flows into the integrated heat exchange part 100.

More specifically, the three-phase valve 300 may be configured to have three ports so that low-temperature coolant can flow in three directions. The first port of the three-phase valve 300 may be connected to the electric parts cooling system, so that low-temperature cooling water cooling the electric parts can be introduced. The second port of the three-phase valve 300 may be an outlet port through which the low-temperature coolant that has cooled the electric parts is supplied toward the integrated heat exchange part 100. The third port of the three-phase valve 300 may be an outlet port configured to circulate the low-temperature coolant that has cooled the electric parts to the low-temperature radiator. The low-temperature radiator may be configured to cool the low-temperature coolant through heat exchange with outside air.

The three-phase valve 300 may be configured to branch off the cooling line at the rear end of the integrated heat exchange part 100. More specifically, when the third port of the three-phase valve 300 is opened, the cooling line at the rear end of the integrated heat exchange part 100 may be directed to the heater. On the other hand, when the second port of the three-phase valve 300 is opened, the cooling line at the rear end of the integrated heat exchange part 100 may be connected to a low-temperature radiator via an electric water pump (EWP). When the second port is opened, the electric water pump may be located at the rear end of the three-phase valve 300 and in the cooling line after the line joins with the rear end of the integrated heat exchange part 100.

The controller 600 may be configured to adjust the opening and closing of the three-phase valve 300 according to operating conditions. In one example, the controller 600 may control the first port and the third port of the three-phase valve 300 to be opened, and the second port to be closed under the start operating conditions and the low-temperature operating conditions. Through this, the controller 600 may introduce high-temperature coolant into the integrated heat exchange part 100 under the start operating conditions and the low-temperature operating conditions to generate condensate.

Also, the controller 600 may control the first port and the second port of the three-phase valve 300 to be opened, and the third port to be closed under high-temperature operating conditions. Through this, the controller 600 may introduce low-temperature coolant into the integrated heat exchange part 100 under the high-temperature operating conditions to generate condensate.

The EGR valve 400 may be connected to the integrated heat exchange part 100. In one example, the EGR valve 400 may be connected to the rear end of the integrated heat exchange part 100 to open and close so that the EGR gas in which the condensate is filtered flows into the engine of the vehicle. The control part 600 (i.e., controller 600) may be configured to adjust the opening and closing of the EGR valve 400 according to operating conditions.

Under the start operating conditions, the controller 600 may control the EGR valve 400 to be closed. In one example, the control unit 600 (i.e., controller 600) may close the EGR valve 400 so that the EGR gas does not flow into the engine in the start operating conditions before vehicle driving. When the EGR valve 400 is closed, the exhaust gas may all be discharged through the exhaust muffler 800.

Under the low-temperature operating conditions and the high-temperature operating conditions, the controller 600 may control the EGR valve 400 to be opened. In one example, in the low-temperature and high-temperature operating conditions when the vehicle is running, the controller 600 may open the EGR valve 400 so that the EGR gas flows into the engine. When the EGR valve 400 is opened, the exhaust gas may be recirculated back to the engine or discharged through the exhaust muffler 800. The controller 600 may be configured to adjust the amount of opening of the EGR valve 400 by calculating the amount of exhaust gas required for recirculation.

The bypass valve 500 may be positioned at the rear end of the integrated heat exchange part 100 to be fluidly connected to the exhaust muffler 800. In one example, the bypass valve 500 may be located at a place where the line in which the exhaust gas flows toward the exhaust muffler 800 and the line at the rear end of the integrated heat exchange part 100 join. Exhaust gas from which condensate has been removed through the filter 210 may be directed toward the EGR valve 400 or toward the exhaust muffler 800.

The controller 600 may be configured to adjust the opening and closing of the bypass valve 500 according to operating conditions. In one example, the controller 600 may be configured to close the bypass valve 500 under the start operating conditions and the low-temperature operating conditions. On the other hand, the controller 600 may open the bypass valve 500 under the high-temperature operating conditions.

More specifically, in the start operating conditions and the low-temperature operating conditions, the controller 600 may determine that exhaust heat recovery is necessary and close the bypass valve 500. When the bypass valve 500 is closed, exhaust heat may be recovered by exhaust gas passing through the integrated heat exchange part 100. On the other hand, in the high-temperature operating conditions, the controller 600 may determine that exhaust heat recovery is unnecessary and open the bypass valve 500. When the bypass valve 500 is opened, exhaust heat may be directed toward the exhaust muffler 800.

Figure 2:
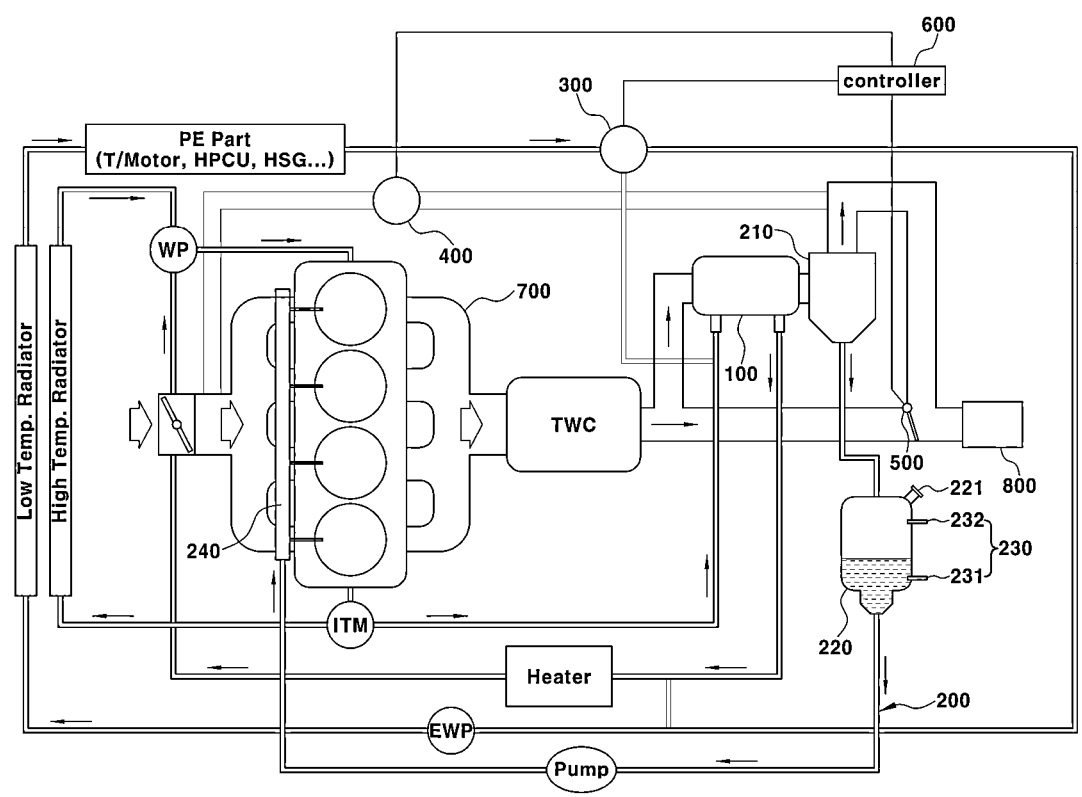
FIG. 2 is a configuration diagram of the injection structure using integrated EHRS condensate under start operating conditions according to an embodiment of the present disclosure.

FIG. 2 is a configuration diagram of the injection structure using integrated EHRS condensate under start operating conditions according to an embodiment of the present disclosure.

Referring to FIG. 2, the controller 600 according to an embodiment of the present disclosure may close the three-phase valve 300, the EGR valve 400, and the bypass valve 500 under the start operating conditions, and control the injector 240 to operate.

More specifically, in the start operating conditions, the controller 600 may determine that the inflow of low-temperature coolant from the electric parts cooling system is unnecessary, and control the three-phase valve 300 to close. Accordingly, the injection structure using integrated EHRS condensate according to an embodiment of the present disclosure may be configured to introduce high-temperature coolant into the integrated heat exchange part 100 immediately after the engine start to generate condensate.

In addition, in the start operating conditions, the controller 600 may determine that exhaust gas recirculation is unnecessary, and control the EGR valve 400 to close. Accordingly, the injection structure using integrated EHRS condensate according to an embodiment of the present disclosure may be configured such that the EGR gas does not flow into the engine before the vehicle is driven.

Also, in the start operating conditions, the controller 600 may determine that exhaust heat recovery is necessary and control the bypass valve 500 to close. Accordingly, the injection structure using integrated EHRS condensate according to an embodiment of the present disclosure may be configured to enable exhaust heat recovery through the integrated heat exchange part 100 during cold start.

The controller 600 may control the injector 240 to operate under the start operating conditions. The injector 240 may be configured to be connected to the rear end of the condensate tank 220, and inject condensate to the engine of the vehicle. More specifically, the injector 240 may be configured to inject condensate into each cylinder of the engine combustion chamber. The injector 240 may be configured to receive the condensate discharged from the condensate tank 220 and inject it into the engine. In one example, condensate discharged from the condensate tank 220 may be supplied to the injector 240 by being pressurized by a pump.

In the injection structure using integrated EHRS condensate according to an embodiment of the present disclosure under the start operating conditions, the condensate is filtered while recovering exhaust heat in the integrated heat exchange part 100. By injecting the filtered condensate into the combustion chamber, the knocking phenomenon is suppressed by reducing the combustion temperature, thereby improving fuel efficiency.

Figure 3:
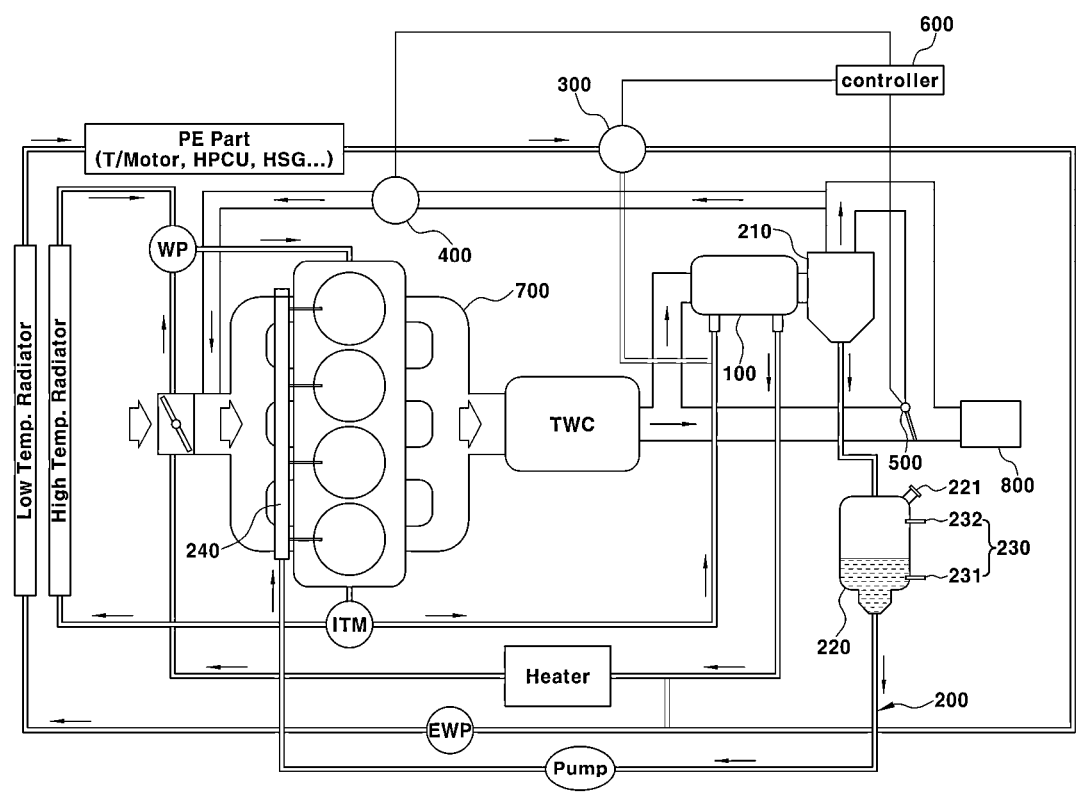
FIG. 3 is a configuration diagram of the injection structure using integrated EHRS condensate under low-temperature operating conditions according to an embodiment of the present disclosure.

FIG. 3 is a configuration diagram of the injection structure using integrated EHRS condensate under low-temperature operating conditions according to an embodiment of the present disclosure.

Referring to FIG. 3, under the low-temperature operating conditions, the controller 600 according to an embodiment of the present disclosure may close the three-phase valve 300 and the bypass valve 500, adjust the opening degree of the EGR valve 400, and control the injector 240 to operate.

When the temperature of the engine coolant is less than or equal to a preset value, the controller 600 may determine that it is a low-temperature operating condition. In an embodiment, the controller 600 may determine that it is the low-temperature operating condition when the temperature of the engine coolant is 60 degrees or less.

More specifically, in the low-temperature operating condition, the controller 600 may determine that the inflow of low-temperature coolant from the electric parts cooling system is unnecessary and control the three-phase valve 300 to close. Accordingly, the injection structure using integrated EHRS condensate according to an embodiment of the present disclosure may be configured to introduce high-temperature coolant into the integrated heat exchange part 100 under the low-temperature operating conditions to generate condensate.

In addition, in the low-temperature operating conditions, the controller 600 may determine that exhaust gas recirculation is necessary, and control the opening degree of the EGR valve 400. In one example, the controller 600 may be configured to calculate the amount of exhaust gas requiring recirculation and adjust the opening degree of the EGR valve 400. Accordingly, the injection structure using integrated EHRS condensate according to an embodiment of the present disclosure may be configured so that an appropriate amount of EGR gas is introduced into the engine depending on the combustion state under the low-temperature operating conditions.

Also, in the low-temperature operating conditions, the controller 600 may determine that exhaust heat recovery is necessary, and control the bypass valve 500 to close. Accordingly, the injection structure using integrated EHRS condensate according to an embodiment of the present disclosure may be configured to enable exhaust heat recovery through the integrated heat exchange part 100 under the low-temperature operating conditions.

The controller 600 may control the injector 240 to operate under the low-temperature operating conditions. In the injection structure using integrated EHRS condensate according to an embodiment of the present disclosure under the low-temperature operating conditions, the condensate is filtered while recovering exhaust heat in the integrated heat exchange part 100. By injecting the filtered condensate into the combustion chamber, the knocking phenomenon is suppressed by reducing the combustion temperature, thereby improving fuel efficiency. Also, according to an embodiment of the present disclosure, in the low-temperature operating conditions, fuel economy may increase by the inflow of EGR gas with condensate filtered.

Figure 4:
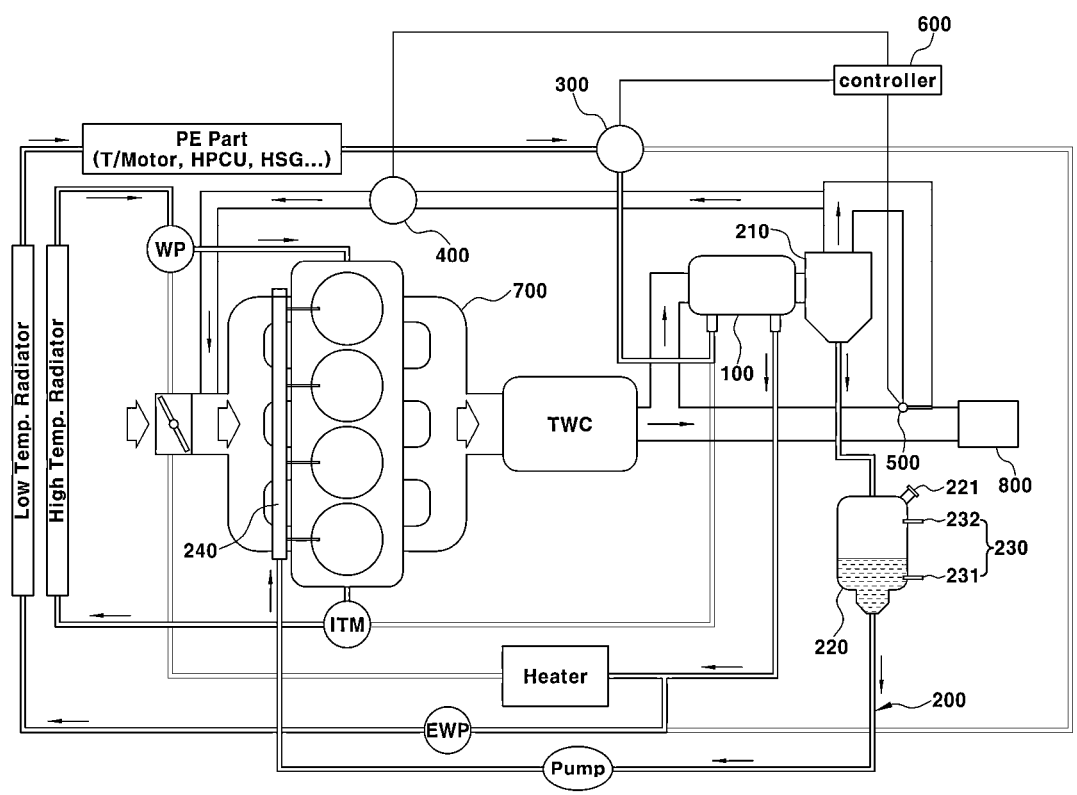
FIG. 4 is a configuration diagram of the injection structure using integrated EHRS condensate under high-temperature operating conditions according to an embodiment of the present disclosure.

FIG. 4 is a configuration diagram of the injection structure using integrated EHRS condensate under high-temperature operating conditions according to an embodiment of the present disclosure.

Referring to FIG. 4, the controller 600 according to an embodiment of the present disclosure may open the three-phase valve 300 and the bypass valve 500, adjust the opening degree of the EGR valve 400, and control the injector 240 to operate under the high-temperature operating conditions. When the temperature of the engine coolant exceeds a preset value, the controller 600 may determine that it is a high-temperature operating condition. As an example, when the temperature of the engine coolant is greater than 60 degrees, the controller 600 may determine that it is the high-temperature operating condition.

More specifically, in the high-temperature operating conditions, the controller 600 may determine that the inflow of low-temperature coolant from the electric parts cooling system is necessary, and control the three-phase valve 300 to open. Accordingly, the injection structure using integrated EHRS condensate according to an embodiment of the present disclosure may be configured to introduce low-temperature coolant into the integrated heat exchange part 100 under high-temperature operating conditions to generate condensate.

In addition, in the high-temperature operating conditions, the controller 600 may determine that exhaust gas recirculation is necessary, and control the opening degree of the EGR valve 400. In one example, the controller 600 may be configured to calculate the amount of exhaust gas requiring recirculation and adjust the opening amount of the EGR valve 400. Accordingly, the injection structure using integrated EHRS condensate according to an embodiment of the present disclosure may be configured so that an appropriate amount of EGR gas is introduced into the engine depending on the combustion state under the high-temperature operating conditions.

Also, in the high-temperature operating conditions, the controller 600 may determine that exhaust heat recovery is unnecessary, and control the bypass valve 500 to open.

Accordingly, the injection structure using integrated EHRS condensate according to an embodiment of the present disclosure may be configured so that exhaust heat recovery through the integrated heat exchange part 100 is not made under the high-temperature operating conditions.

The controller 600 may control the injector 240 to operate under the high-temperature operating conditions. In the injection structure using integrated EHRS condensate according to an embodiment of the present disclosure under the high-temperature operating conditions, the condensate filtered in the integrated heat exchange part 100 using low-temperature coolant is injected into the combustion chamber, which reduces the combustion temperature and suppresses the knocking phenomenon, thereby improving fuel efficiency. Also, according to an embodiment of the present disclosure, in the high-temperature operating conditions, fuel economy may increase by the inflow of EGR gas with condensate filtered.

According to an embodiment of the present disclosure, an integrated thermal management valve (hereinafter referred to as "ITM") may be configured so that the high-temperature coolant does not flow into the integrated heat exchange part 100 under the high-temperature operating conditions. The ITM may be configured to open and close according to the operating state of the engine in conjunction with the controller 600. Under the high-temperature operating conditions, the port of the ITM connected to the front end of the integrated heat exchange part 100 may be closed so that high-temperature coolant does not flow into the integrated heat exchange part 100.

Figure 5:
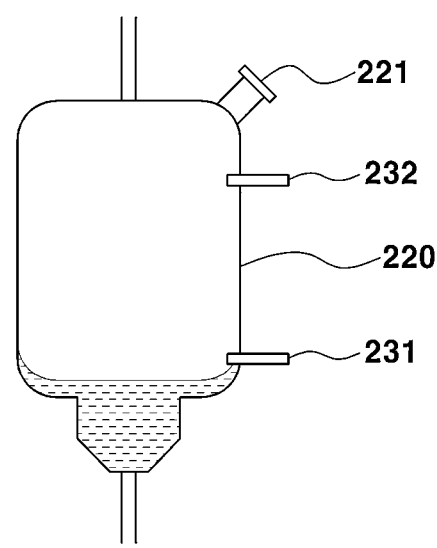
FIG. 5 is a view showing a condensate tank of the injection structure using integrated EHRS condensate according to an embodiment of the present disclosure.

FIG. 5 is a view showing a condensate tank 220 of the injection structure using integrated EHRS condensate according to an embodiment of the present disclosure.

Referring to FIG. 5, the level sensor 230 according to an embodiment of the present disclosure may be configured to include a first level sensor 231 and a second level sensor 232 positioned higher in the height direction of the condensate tank than the first level sensor 231. The first level sensor 231 may be positioned in the condensate tank 220. In one example, the first level sensor 231 may be located at one end of the condensate tank 220 and measure the amount of stored condensate.

The controller 600 may receive a first signal from the first level sensor 231 and control to stop the operation of the injector 240. The first signal may be generated when the amount of condensate stored in the condensate tank 220 is less than the amount of condensate required to be sprayed through the injector 240. When receiving the first signal, the controller 600 may control combustion according to non-operation of the injector 240.

The second level sensor 232 may be positioned higher in the height direction of the condensate tank 220 than the first level sensor 231. The controller 600 may receive a second signal from the second level sensor 232 and control the injector 240 to operate. The second signal may be generated when the amount of condensate stored in the condensate tank 220 is greater than the amount of condensate required to be sprayed through the injector 240. When receiving the second signal, the controller 600 may control to increase the amount of condensate injection by operating the injector 240 after stopping the EGR and EHRS operations to prevent condensate backflow to the filter 210.

The injection structure using integrated EHRS condensate according to the present disclosure may be configured to further include an inlet 221 positioned in a condensate tank 220, and formed so that water is able to be filled from outside (i.e., so that the condensate tank 220 is able to be filled with water from outside the condensate tank 220). As an example, the inlet 221 may be configured to separately fill the condensate tank 220 with water (pure water) from the outside as much as the required injection amount. Accordingly, the collected condensate and externally supplied water may be mixed and stored in the condensate tank 220. As the inlet 221 is formed in the condensate tank 220 according to another embodiment of the present disclosure, the amount of condensate required for condensate injection is sufficient so as to expand the area where condensate can be sprayed on the engine.

To sum up, the present disclosure provides an injection structure using integrated EHRS condensate, in which the exhaust gas condensate can be utilized for the water injection technology by configuring the separate condensate circuit part 200, and which can easily generate condensate required for water injection according to operating conditions by controlling the opening and closing of the three-phase valve 300, the EGR valve 400, and the bypass valve 500 with the controller 600.

The above detailed description is illustrative of the present disclosure. In addition, the above-mentioned content shows and describes the embodiments of the present disclosure, thus the present disclosure may be used in various other combinations, modifications, and environments. In other words, changes or modifications can be made within the scope of the concepts of the present disclosure disclosed herein, the scope equivalent to the described disclosure, and/or within the skill or knowledge in the art. The described embodiments are to explain the best mode for implementing the technical idea of the present disclosure, and various modifications required in the specific field of application and use of the present disclosure are also possible. Accordingly, the detailed description of the present disclosure is not intended to limit the present disclosure to the disclosed embodiments. Also, the appended claims should be construed to include other embodiments as well.

What is claimed is:

1. An injection structure using integrated exhaust heat recovery system (EHRS) condensate, the injection structure comprising:
    an integrated heat exchange part connected to an engine of a vehicle, and branched with an exhaust muffler from an exhaust outlet of an exhaust manifold to integrate exhaust gas recirculation (EGR) and EHRS;

a condensate circuit part extended from a rear end of the integrated heat exchange part to the engine of the vehicle, and configured to move exhaust gas condensate;

a three-phase valve connected to a front end of the integrated heat exchange part, and configured to open and close so that a low-temperature coolant is selectively introduced into the integrated heat exchange part according to operating conditions;

an EGR valve connected to the integrated heat exchange part, and configured to open and close so that EGR gas with filtered condensate flows into the engine of the vehicle;

a bypass valve positioned at the rear end of the integrated heat exchange part to be fluidly connected to the exhaust muffler; and a controller configured to control opening and closing of the three-phase valve, the EGR valve, and the bypass valve according to the operating conditions.

2. The injection structure using integrated EHRS condensate of claim 1, wherein the condensate circuit part comprises:

a filter connected to the rear end of the integrated heat exchange part, and configured to filter the condensate from the exhaust gas;

a condensate tank connected to the filter, and configured to store filtered condensate;

a level sensor formed in the condensate tank, and configured to measure a flow rate of condensate stored in the condensate tank; and an injector connected to the rear end of the condensate tank, and configured to inject condensate discharged from the condensate tank to the engine of the vehicle.

3. The injection structure using integrated EHRS condensate of claim 1, wherein the three-phase valve is connected to an electric parts cooling system, wherein the controller controls the low-temperature coolant to flow into the integrated heat exchange part from the electric parts cooling system by opening the three-phase valve under high-temperature operating conditions.

4. The injection structure using integrated EHRS condensate of claim 2, wherein the controller closes the three-phase valve, the EGR valve, and the bypass valve, and controls the injector to operate under start operating conditions.

5. The injection structure using integrated EHRS condensate of claim 2, wherein the controller closes the three-phase valve and the bypass valve, adjusts an opening degree of the EGR valve, and controls the injector to operate under low-temperature operating conditions.

6. The injection structure using integrated EHRS condensate of claim 2, wherein the controller opens the three-phase valve and the bypass valve, adjusts an opening degree of the EGR valve, and controls the injector to operate under high-temperature operating conditions.

7. The injection structure using integrated EHRS condensate of claim 2, wherein the level sensor comprises:

a first level sensor positioned in the condensate tank; and a second level sensor positioned higher in a height direction of the condensate tank than the first level sensor.

8. The injection structure using integrated EHRS condensate of claim 7, wherein the controller receives a first signal from the first level sensor and controls the injector to stop an operation.

9. The injection structure using integrated EHRS condensate of claim 7, wherein the controller receives a second signal from the second level sensor and controls the injector to operate.

10. The injection structure using integrated EHRS condensate of claim 2, further comprising:

an inlet positioned in the condensate tank, and formed so that the condensate tank is able to be filled with water from outside the condensate tank.

* * * * *